(12) United States Patent
Pramudji et al.

(10) Patent No.: US 9,767,633 B2
(45) Date of Patent: Sep. 19, 2017

(54) REMOTE KEYLESS SYSTEM

(71) Applicants: Thomas Zane Pramudji, Houston, TX (US); Ari Pramudji, Houston, TX (US)

(72) Inventors: Thomas Zane Pramudji, Houston, TX (US); Ari Pramudji, Houston, TX (US)

( * ) Notice: Subject to any disclaimer, the term of this patent is extended or adjusted under 35 U.S.C. 154(b) by 135 days.

(21) Appl. No.: 14/481,850

(22) Filed: Sep. 9, 2014

(65) Prior Publication Data

US 2016/0071345 A1    Mar. 10, 2016

(51) Int. Cl.
*G05B 19/00*    (2006.01)
*G07C 9/00*     (2006.01)
*B60R 25/20*    (2013.01)

(52) U.S. Cl.
CPC ..... *G07C 9/00944* (2013.01); *G07C 9/00309* (2013.01); *B60R 25/2009* (2013.01); *G07C 2209/62* (2013.01)

(58) Field of Classification Search
CPC .................. G07C 9/00309; G07C 2209/62
USPC ....................................................... 340/5.72
See application file for complete search history.

(56) References Cited

U.S. PATENT DOCUMENTS

| | | | | |
|---|---|---|---|---|
| 5,568,120 A * | 10/1996 | LeMense | ............ | B60R 25/1003 180/257 |
| 5,898,365 A * | 4/1999 | Niederlein | ......... | G07C 9/00309 180/287 |
| 6,243,022 B1 * | 6/2001 | Furukawa | .................. | B60J 1/20 180/271 |
| 6,414,591 B1 * | 7/2002 | Watanabe | ........... | B60R 16/0231 180/286 |
| 7,167,083 B2 * | 1/2007 | Giles | ....................... | B60R 25/00 307/10.1 |
| 2004/0075532 A1 * | 4/2004 | Ueda | ....................... | E05B 77/48 340/5.72 |
| 2004/0100360 A1 * | 5/2004 | Chandebois | ............ | B60R 25/24 340/5.72 |
| 2004/0100392 A1 * | 5/2004 | Brillon | ............... | G07C 9/00309 340/12.51 |
| 2006/0012462 A1 * | 1/2006 | Teshima | .................. | B60R 25/04 340/5.61 |
| 2007/0179682 A1 * | 8/2007 | Hu | ...................... | B60R 25/1003 701/1 |
| 2008/0061932 A1 * | 3/2008 | Hermann | ............ | B60R 25/2036 340/5.72 |

* cited by examiner

*Primary Examiner* — Vernal Brown
(74) *Attorney, Agent, or Firm* — Pramudji Law Group PLLC; Ari Pramudji

(57) ABSTRACT

A remote keyless system having a light; and a controller coupled to the light. The controller has a processor and memory having stored thereon a plurality of executable instructions which, when executed by the processor, cause the processor to: receive a door closing signal from a door locking system. The door closing signal indicates that one or more doors of a vehicle have been opened and then closed within a predetermined amount of time. The instructions further cause the computer to turn the light on in response to receiving the door closing signal, send a locking signal to the door locking system, and receive a confirmation signal from the door locking system. The confirmation signal indicates that all doors of the vehicle have been successfully locked. The instructions further cause the computer to turn the light off in response to receiving the confirmation signal.

7 Claims, 4 Drawing Sheets

REMOTE KEYLESS SYSTEM

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A keyless entry system is an electronic lock that controls access to a building or vehicle without using a traditional mechanical key. The term remote keyless system (RKS), also called keyless entry or remote central locking, refers to a lock that uses an electronic remote control as a key that is activated by a handheld device or automatically by proximity. Widely used in automobiles, an RKS performs the functions of a standard car key without physical contact. When within a few yards of the car, pressing a button on the remote can lock or unlock the doors, and may perform other functions.

SUMMARY

Various implementations described herein are directed to a method for operating a remote keyless system. In one implementation, the method may receive a door closing signal from a door locking system. The door closing signal indicates that one or more doors of a vehicle have been opened and then closed within a predetermined amount of time. The method may then turn an indicator coupled to a remote keyless system on in response to receiving the door closing signal and send a locking signal to the door locking system. The method may then receive a confirmation signal from the door locking system. The confirmation signal indicates that all doors of the vehicle have been successfully locked. The method may then turn the indicator off in response to receiving the confirmation signal.

In one implementation, the predetermined amount of time ranges from about 1 second to about 30 seconds. The indicator may be a light, a sound generating unit or a voice generating unit.

In another implementation, the door closing signal is transmitted by the door locking system only when all of the doors of the vehicle have been closed.

In yet another implementation, the door closing signal is transmitted by the door locking system only when the engine has been turned off.

Various implementations described herein are directed to a remote keyless system, which includes a light; and a controller coupled to the light. The controller has a processor and memory having stored thereon a plurality of executable instructions which, when executed by the processor, cause the processor to: receive a door closing signal from a door locking system. The door closing signal indicates that one or more doors of a vehicle have been opened and then closed within a predetermined amount of time. The instructions further cause the computer to turn the light on in response to receiving the door closing signal and send a locking signal to the door locking system. The instructions further cause the computer to receive a confirmation signal from the door locking system. The confirmation signal indicates that all doors of the vehicle have been successfully locked. The instructions further cause the computer to turn the light off in response to receiving the confirmation signal.

In one implementation, the remote keyless system has a receiver for receiving the door closing signal from the door locking system and a transmitter for sending the locking signal to the door locking system.

In one implementation, the method may receive a door closing signal from a door locking system, turn a light coupled a remote keyless system on in response to receiving the door closing signal, send a locking signal to the door locking system, and turn the light off in response to sending the locking signal.

In yet another implementation, the method may turn on a sound or voice generating unit coupled to the remote keyless system in response to receiving the door closing signal in addition to turning on the light.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
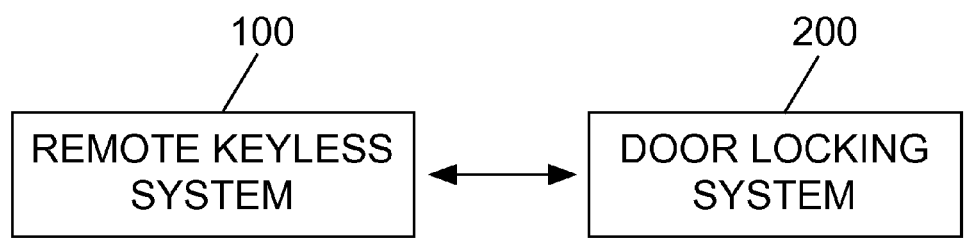
FIG. 1 illustrates a remote keyless system (RKS) in communication with a door locking system in accordance with various implementations described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various techniques described herein are directed to a remote keyless system that may be used to lock and unlock a door locking system of a vehicle, an automobile or a car. The remote keyless system may also commonly be referred to as a remote control, key fob or the like. In one implementation, once the engine of the automobile is turned off and the doors of the vehicle are opened and closed, a light on the remote keyless system is turned on. This light remains on until the remote keyless system receives a confirmation that all the doors of the vehicle have been locked. In this manner, the light acts as a reminder that the doors have not been locked. In addition to light, other reminders, such as sound or voice recording may also be used Various implementations of input for marine electronics described herein will now be described in more detail with reference to FIGS. 1-5.

FIG. 1 illustrates a remote keyless system (RKS) 100 in communication with a door locking system 200 in accordance with various implementations described herein. In one implementation, the RKS 100 may be in communication with the door locking system 200 wirelessly, via a wireless network, via radio frequency (RF), or via short range radio waves. The RKS 100 may be configured to send a signal to the door locking system 200 to lock and unlock doors, alarm and disalarm vehicles, or open and close certain features of the vehicle, such as trunks, glove compartments, sun roof, etc. The vehicle may be an automobile, car, or anything else that has doors.

Figure 2:
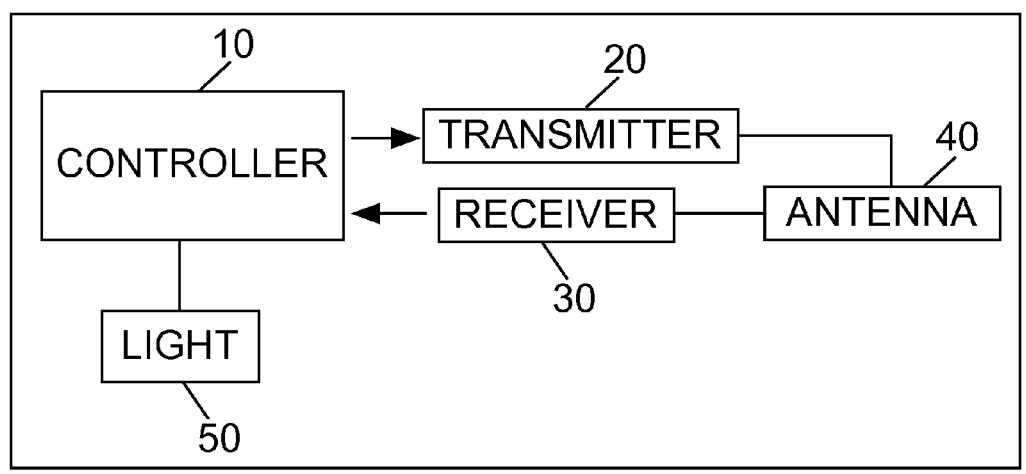
FIG. 2 is illustrates the RKS in accordance with implementations of various techniques described herein.

FIG. 2 illustrates the RKS 100 in more detail. Specifically, the RKS 100 has a controller 10 in communication with a light 50, transmitter 20 and receiver 30. The transmitter 20 and receiver 30 are coupled to an antenna 40 for receiving and sending signals from and to the door locking system 200. The controller 10 is configured to send signals via the transmitter 20 and the antenna 40 to the door locking system 200. Some of the signals include locking and unlocking doors of a vehicle, alarming and disalarming the vehicle, opening and closing certain components of the vehicle.

Figure 3:
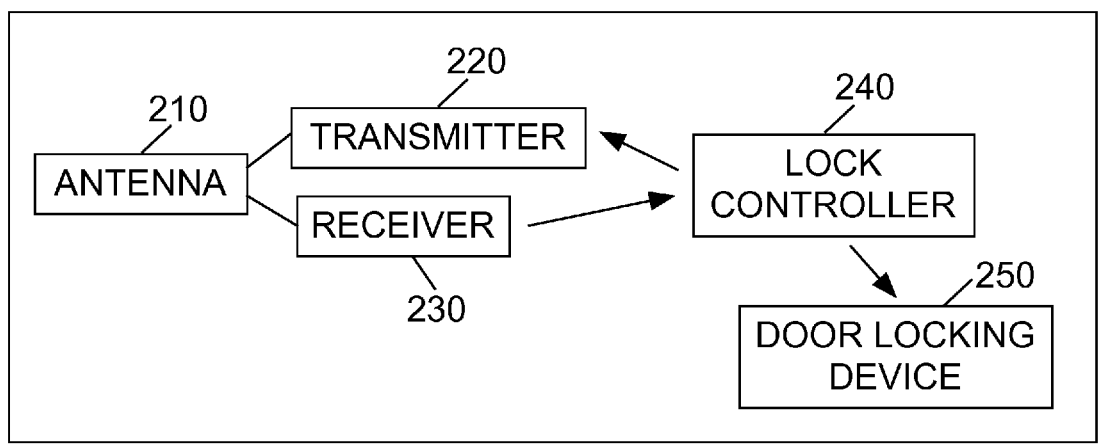
FIG. 3 is the door locking system in accordance with implementations of various techniques described herein.

FIG. 3 illustrates the door locking system 200 in more detail. The door locking system 200 has a lock controller 240 in communication with a door locking device 250, transmitter 220 and receiver 230. The transmitter 220 and receiver 230 are coupled to an antenna 210 for receiving and sending signals from and to the RKS 100. The lock controller 240 is configured to operate with the door locking device 250 to lock and unlock the doors of the vehicle.

Figure 4:
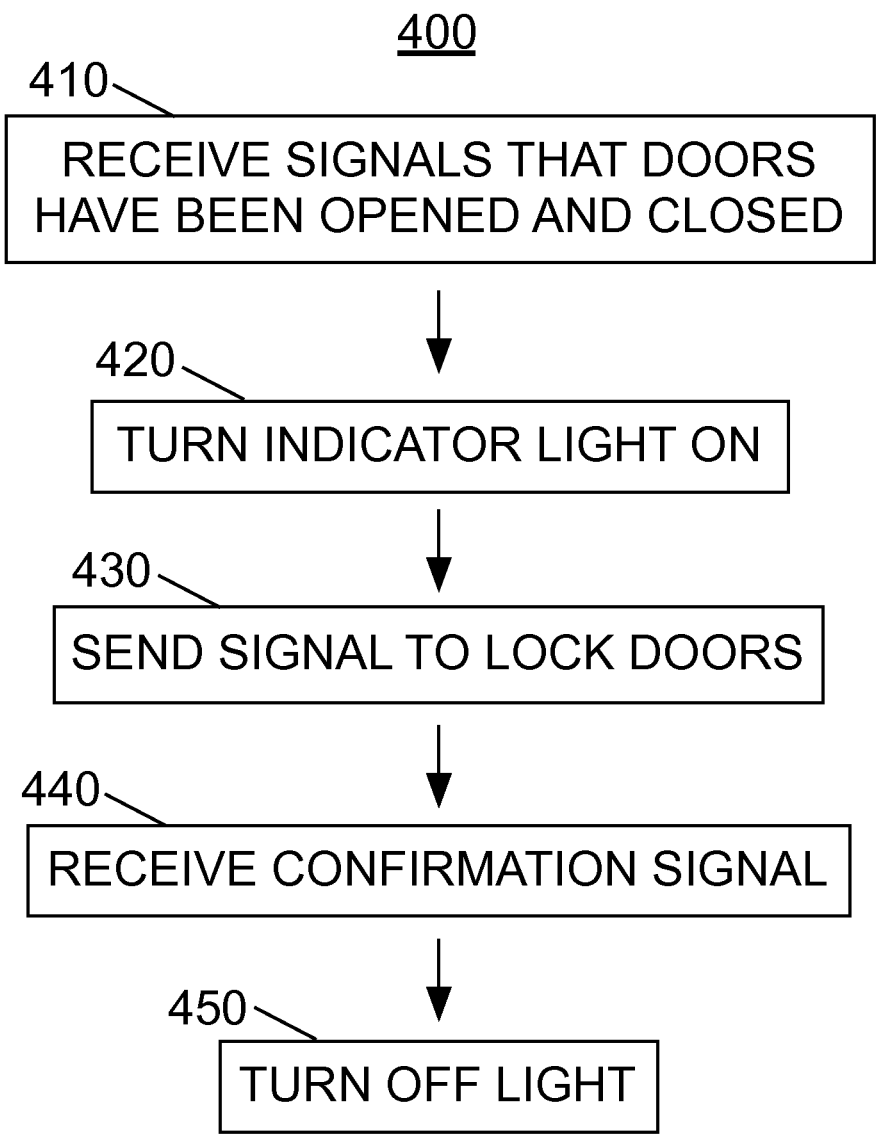
FIG. 4 is a flow diagram for a method of locking and unlocking doors of a vehicle in accordance with implementations of various techniques described herein.

FIG. 4 is a flow diagram of a method 400 for locking and unlocking doors of a vehicle in accordance with various implementations described herein. In one implementation, certain operations of method 400 may be performed by the controller 100. Further, certain aspects of method 400 may be performed by a computer system, such as a portable computer system, a smart phone device, a remote server and the like. It should be understood that while method 400 indicates a particular order of execution of operations, in some implementations, certain portions of the operations might be executed in a different order, and on different systems. Further, in some implementations, additional operations or steps may be added to the method 400. Likewise, some operations or steps may be omitted.

At step 410, one or more signals from the door locking system 200 are received, where the signals indicate that one or more doors of a vehicle have been opened and then closed within a predetermined amount of time. The predetermined amount of time may range from about 3 seconds to about 1 minute. This predetermined amount of time reflects people opening the doors of the vehicle and closing the doors upon reaching a destination, e.g., home, parking lot, driveway, etc. In one implementation, the door locking system 200 would only send the signals when all of the doors of the vehicle are closed. In another implementation, the door locking system 200 would send the signals only after the engine of the vehicle has been turned off. For instance, the door locking system 200 would receive a signal from a sensor that communicates with the engine.

At step 420, in response to receiving the signals from the door locking system 200, the RKS 100 would turn the light 50 on. In one implementation, the light 50 would remain on until the RKS 100 sends a locking signal to the door locking system 200. In this manner, the light 50 being on may serve to tell a user that the doors have not been locked. In some implementations, another indicator may be used in lieu of a light or in addition to the light. For instance, a voice recording may be played repeatedly to remind the user that the doors have not been locked, i.e., THE DOORS ARE NOT LOCKED. This recording may be played using a voice generation unit. In another instance, a sound may be played repeatedly, e.g., a beep, chime, etc., to remind the user that the doors have not been locked. The sound would be generated from a sound generation unit.

At step 430, the RKS 100 sends the locking signal to the door locking system 200 to lock all the doors of the vehicle. The locking signal may be sent in response to a user pressing a button on the RKS 100. Upon receiving the locking signal, the lock controller 240 in the door locking system 200 would then communicate with the door locking device 250 to lock all the doors. If the door locking system 200 are able to successfully lock all the doors, the RKS 100 would receive a confirmation signal from the door locking system 200, at step 440. The confirmation signal indicates that all the doors of the vehicle have successfully been locked.

At step 450, in response to receiving the confirmation signal, the RKS 100 would turn the light 50 off to indicate to the user that the doors have been successfully locked. In one implementation, where not all of the doors are closed, the door locking system 200 would not be able to lock all of the doors, and no confirmation signal would be received by the RKS 100. In response to not receiving the confirmation signal, the light 50 would remain on. This would indicate the user that doors cannot be locked and that perhaps one of the doors may still be open.

Computing System

Certain aspects of various technologies described herein may be operational with numerous general purpose or special purpose computing system environments or configurations. Examples of well-known computing systems, environments, and/or configurations that may be suitable for use with the various technologies described herein include, but are not limited to, controllers, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Figure 5:
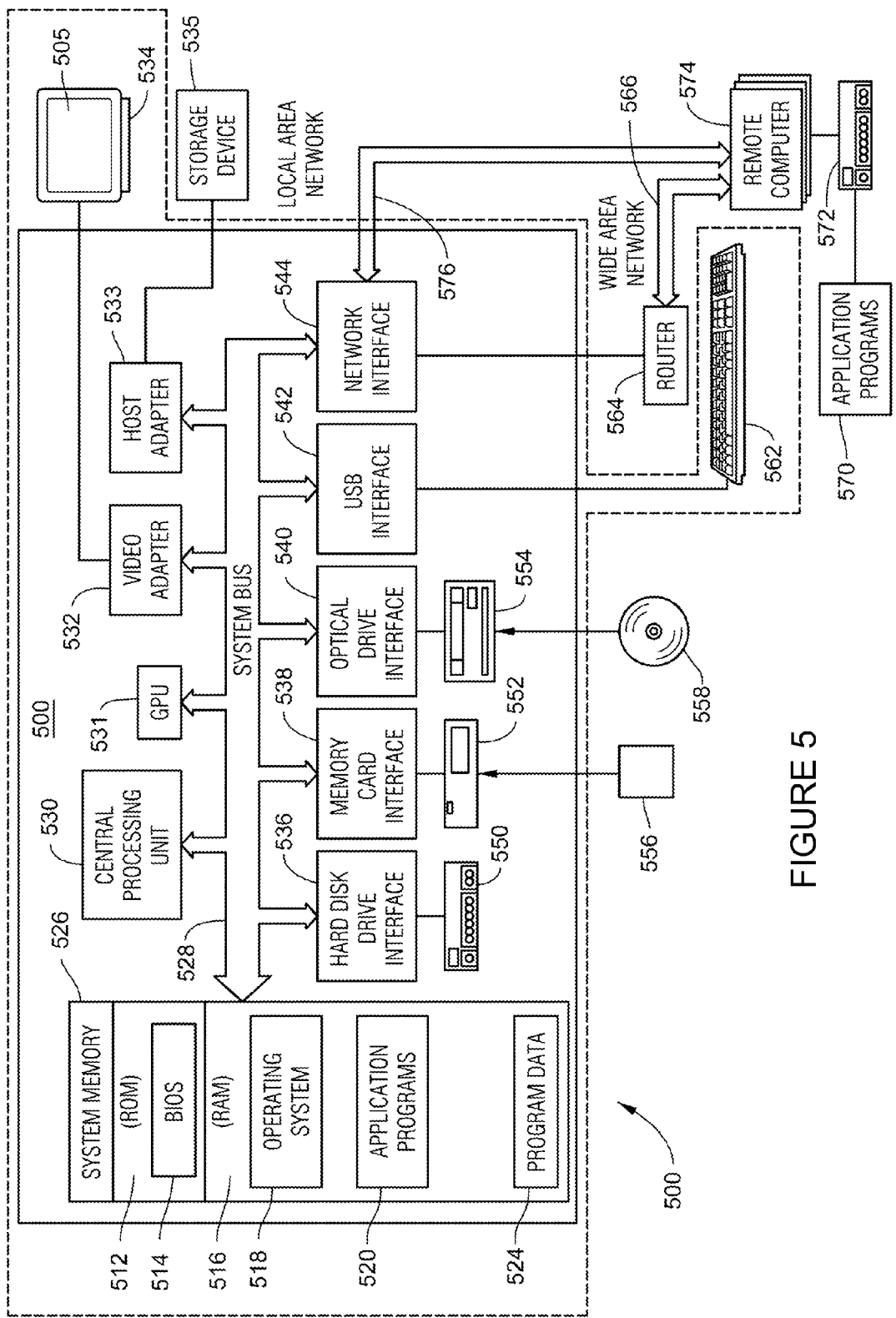
FIG. 5 illustrates a schematic diagram of a computing system in which the various technologies described herein may be incorporated and practiced.

FIG. 5 illustrates a computer system 500 into which implementations of various technologies and techniques described herein may be implemented. Computing system 500 may be a controller, a key fob, a handheld device, a wearable device, a personal digital assistant, a server computer, an electronic device/instrument, a laptop, or a tablet. It should be noted, however, that other computer system configurations may be used.

The computing system 500 may include a central processing unit (CPU) 530, a system memory 526 and a system bus 528 that couples various system components including the system memory 526 to the CPU 530. Although only one CPU 530 is illustrated in FIG. 5, it should be understood that in some implementations the computing system 500 may include more than one CPU 530.

The CPU 530 can include a microprocessor, a microcontroller, a processor, a programmable integrated circuit, or a combination thereof. The CPU 530 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 530 may also include a proprietary processor. The CPU may include a multi-core processor.

The CPU 530 may provide output data to a Graphics Processing Unit (GPU) 531. The GPU 531 may generate graphical user interfaces that present the output data. The GPU 531 may also provide objects, such as menus, in the graphical user interface. A user may provide inputs by interacting with the objects. The GPU 531 may receive the inputs from interaction with the objects and provide the inputs to the CPU 530. In one implementation, the CPU 530 may perform the tasks of the GPU 531. A video adapter 532 may be provided to convert graphical data into signals for a monitor 534. The monitor 534 includes a screen 505. The screen 505 can be sensitive to heat or touching (now collectively referred to as a "touch screen"). In one implementation, the computer system 500 may not include a monitor 534.

The GPU 531 may be a microprocessor specifically designed to manipulate and implement computer graphics. The CPU 530 may offload work to the GPU 531. The GPU 531 may have its own graphics memory, and/or may have access to a portion of the system memory 526. As with the CPU 530, the GPU 531 may include one or more processing units, and each processing unit may include one or more cores.

The system bus 528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 526 may include a read only memory (ROM) 512 and a random access memory (RAM) 516. A basic input/output system (BIOS) 514, containing the basic routines that help transfer information between elements within the computing system 500, such as during start-up, may be stored in the ROM 512. The computing system may be implemented using a printed circuit board containing various components including processing units, data storage memory, and connectors.

Certain implementations may be configured to be connected to a GPS and/or a sonar system. The GPS and/or sonar system may be connected via the network interface 544 or Universal Serial Bus (USB) interface 542. In one implementation, the computing system 500, the monitor 534, the screen 505 and buttons may be integrated into a console.

The computing system 500 may further include a hard disk drive 536 for reading from and writing to a hard disk 550, a memory card reader 552 for reading from and writing to a removable memory card 556 and an optical disk drive 554 for reading from and writing to a removable optical disk 558, such as a CD ROM, DVD ROM or other optical media. The hard disk drive 550, the memory card reader 552 and the optical disk drive 554 may be connected to the system bus 528 by a hard disk drive interface 536, a memory card interface 538 and an optical drive interface 540, respectively. The drives and their associated computer-readable media may provide nonvolatile storage of computer-readable instructions, data structures, program modules and other data for the computing system 500.

Although the computing system 500 is described herein as having a hard disk 550, a removable memory card 556 and a removable optical disk 558, it should be appreciated by those skilled in the art that the computing system 500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 500 may also include a host adapter 533 that connects to a storage device 535 via a small computer system interface (SCSI) bus, a Fiber Channel bus, an eSATA bus, or using any other applicable computer bus interface. The computing system 500 can also be connected to a router 564 to establish a wide area network (WAN) 566 with one or more remote computers 574. The router 764 may be connected to the system bus 728 via a network interface 744. The remote computers 774 can also include hard disks 572 that store application programs 570.

In another implementation, the computing system 500 may also connect to one or more remote computers 574 via local area network (LAN) 576 or the WAN 566. When using a LAN networking environment, the computing system 500 may be connected to the LAN 576 through the network interface or adapter 544. The LAN 576 may be implemented via a wired connection or a wireless connection. The LAN 576 may be implemented using Wi-Fi technology, cellular technology, or any other implementation known to those skilled in the art. The network interface 544 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 574. It will be appreciated that the network connections shown are exemplary and other means of establishing a communications link between the computer systems may be used. The network interface 544 may also include digital cellular networks, Bluetooth, or any other wireless network interface.

Although the computing system 500 has been described with many components it should be understood that various implementations described herein may be operational without some of these components. For instance, the one or more remote computers 574 may be optional.

A number of program modules may be stored on the hard disk 550, memory card 556, optical disk 558, ROM 512 or RAM 516, including an operating system 518, one or more application programs 520, program data 524 and a database system. The one or more application programs 520 may contain program instructions configured to perform method 400 according to various implementations described herein. The operating system 518 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 500 through input devices such as a keyboard 562 and pointing device. Other input devices may include a microphone, joystick, game pad, satellite dish, scanner, user input button, wearable device, or the like. These and other input devices may be connected to the CPU 530 through a USB interface 542 coupled to system bus 528, but may be connected by other interfaces, such as a parallel port, Bluetooth or a game port. A monitor 505 or other type of display device may also be connected to system bus 528 via an interface, such as a video adapter 532. In addition to the monitor 534, the computing system 500 may further include other peripheral output devices such as speakers and printers.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon a plurality of computer-executable instructions which, when executed by a computer, cause the computer to:
   receive a door closing signal from a door locking system, wherein the door closing signal is received by a remote keyless system and wherein the door closing signal indicates that one or more doors of a vehicle have been opened and then closed within a predetermined amount of time, wherein door closing signal is transmitted by the door locking system only when all of the doors of the vehicle have been closed, wherein the predetermined amount of time ranges from about 1 second to about 30 seconds;
   turn an indicator coupled to the remote keyless system on in response to receiving the door closing signal, wherein the indicator indicates that the doors of the vehicle have not been locked and wherein indicator comprises a light;
   send a locking signal from the remote keyless system to the door locking system;
   receive a confirmation signal from the door locking system, wherein the confirmation signal indicates that all doors of the vehicle have been successfully locked;
   turn the indicator off in response to receiving the confirmation signal; and
   keep the indicator on if no confirmation signal is received from the door locking system to indicate that the doors cannot be locked.

2. A remote keyless system, comprising:
   a light; and
   a controller coupled to the light, wherein the controller has a processor and memory having stored thereon a plurality of executable instructions which, when executed by the processor, cause the processor to:
      receive a door closing signal from a door locking system, wherein the door closing signal indicates that one or more doors of a vehicle have been opened and then closed within a predetermined amount of time, wherein door closing signal is transmitted by the door locking system only when all of the doors of the vehicle have been closed, wherein the predetermined amount of time ranges from about 1 second to about 30 seconds;
      turn the light on in response to receiving the door closing signal, wherein the light being turned on indicates that the doors of the vehicle have not been locked;
      send a locking signal to the door locking system;
      receive a confirmation signal from the door locking system, wherein the confirmation signal indicates that all doors of the vehicle have been successfully locked;
      turn the light off in response to receiving the confirmation signal; and
      keep the light on if no confirmation signal is received from the door locking system to indicate that the doors cannot be locked.

3. The remote keyless system of claim 2, further comprising a receiver for receiving the door closing signal from the door locking system.

4. The remote keyless system of claim 2, further comprising a transmitter for sending the locking signal to the door locking system.

5. A non-transitory computer-readable medium having stored thereon a plurality of computer-executable instructions which, when executed by a computer, cause the computer to:
   receive a door closing signal at a remote keyless system from a door locking system, wherein the door closing signal indicates that one or more doors of a vehicle have been opened and then closed within a predetermined amount of time, wherein door closing signal is transmitted by the door locking system only when all of the doors of the vehicle have been closed;
   turn a light coupled the remote keyless system on in response to receiving the door closing signal, wherein the light being turned on indicates that the doors of the vehicle have not been locked;
   send a locking signal from the remote keyless system to the door locking system;
   receive a confirmation signal from the door locking system, wherein the confirmation signal indicates that all doors of the vehicle have been successfully locked; and
   turn the light off in response to sending the locking signal.

6. The non-transitory computer-readable medium of claim 5, wherein the light is turned off only upon receipt of the confirmation signal.

7. The non-transitory computer-readable medium of claim 1, further comprising instructions configured to send a signal to alarm and/or disalarm the vehicle.

* * * * *